United States Patent Office 3,154,522
Patented Oct. 27, 1964

3,154,522
POLYISOCYANURATE PREPARATION USING A TRIETHYLENE DIAMINE AND A TERTIARY IMINE CO-CATALYST
Burton D. Beitchman, Springfield Township, Pa., assignor to Air Products and Chemicals, Inc., Philadelphia, Pa., a corporation of Delaware
No Drawing. Filed Apr. 20, 1962, Ser. No. 188,944
2 Claims. (Cl. 260—77.5)

This invention relates to methods for the catalysis of the polymerization of organic compositions characterized by isocyanato groups and to catalyst compositions for such methods. The isocyanato compositions can be polymerized, isocyanurate groups being formed by trimerization in the presence of what are conveniently designated as polymerization catalysts. The isocyanato groups react with reactive hydrogen in materials such as alcohols, phenols, primary amines, secondary amines, ureas, amides, carboxylic acids and the like. A variety of materials sometimes conveniently designated as polyurethane compositions have been prepared by interaction of substances containing a plurality of reactive hydrogen atoms per molecule and substances containing a plurality of isocyanato groups per molecule. Catalyst compositions containing components such as organic compounds of tin, tertiary amines, and epoxy alkanes, have been used as polyurethane catalysts for preparing such polyurethane compositions.

The order of effectivness among catalysts is generally different for the polyurethane reaction and the trimerization reaction, but many catalysts have measurable activity for both reactions. Prior literature has explained how to determine the relative order of catalytic effectiveness for a series of catalysts for isolated systems. The reaction between an aliphatic alcohol and phenyl isocyanate has been tested in certain isolated systems. The rate of polymerization of phenyl isocyanate to the trimeric form as an isocyanurate has been measured in other tests. For example, an article by J. W. Britain et al. in J. Appl. Polymer Sci., vol. 4, 207 (September 1960) explains in Table XI that an organic tin salt such as stannous octoate exhibits relatively greater activity than triethyl amine (the preferred urethane catalysts for many years), for the reaction of the alcoholic hydroxyl groups of a polyol with isocyanato groups. Burkus 2,979,485 discloses that the combination of triethyl amine and a $C_2$ or $C_3$ epoxy alkane (i.e., ethyleneoxide or epoxy propane) is particularly effective for the trimerization of phenyl isocyanate and/or the polymerization of tolylene diisocyanate. Although there appears to be some correlation between the catalytic effectiveness of catalysts in the isolated systems and in the polymerization in plastics factories, a portion of the results differ significantly from what might have been predicted on the basis of the data from the isolated systems. Accordingly, the catalysis of mixtures for the production of useful products from compositions characterized by isocyanato groups must be treated as an empirical art.

As used in this specification, the term "imine" designates a three membered ring containing nitrogen; the term "tertiary imine" designates three membered rings in which there are three carbon atoms attached to the nitrogen; and the term "lower imine" designates three membered aza ring molecules containing at least 3 but not more than 9 carbon atoms per molecule.

In accordance with the present invention a lower tertiary imine is employed to catalyze the polymerization of organic compositions containing isocyanato groups as the principal reactive groups, either employing such lower tertiary imine as the sole catalyst or as a co-catalyst in combination with tertiary amines, metallo organic compounds, metal soaps of carboxylic acids, epoxyalkanes, and/or other polymerization catalysts.

The nature of the present invention is further clarified by reference to several examples.

Example I (a) To 100 parts by weight of tolylene diisocyanate (80% 2,4-isomer, 20% 2,6-isomer), 1.0 part by weight of N-methyl ethylene imine was added with stirring. The temperature rose from an initial value of 28° C. to 117° C. over a five minute interval and, on cooling the molten mass to room temperature, the whole mass solidified.

(b) To 100 parts of tolylene diisocyanate, 0.4 part of triethylene diamine and 0.16 part of N-methyl ethylene imine were added with stirring. The temperature rose from an initial value of 28° C. to a maximum of 141° C. in less than 2 minutes, at which time the thermometer was withdrawn and the polymer solidified.

(c) To 100 parts by weight of tolylene diisocyanate, 1.0 part by weight of N-methyl ethylene imine and 1.6 parts of butylene oxide were added with stirring. The temperature rose from an initial value of 28° C. to 133° C. in 4.5 minutes, at which time the thermometer was withdrawn and the mass solidified.

These data show that tolylene diisocyanate can be polymerized to form a solid without the use of external heat above 28° C. by the use of catalyst systems consisting of a lower tertiary imine either alone or with co-catalysts such as a tertiary amine or an epoxy alkane. The epoxy alkane cooperates in such a way that a higher temperature is attained. The coaction between the tertiary amine and tertiary imine is such that the peak measured temperature is higher, the rate of increase of temperature is greater, and the reaction time is shorter.

Example II

When 100 parts of diisocyanatophenyl-methane, 17 parts of phenyl isocyanate and 1.5 parts of N-ethyl ethylene imine are mixed with stirring, an instantaneous exothermic reaction is evident with the temperature rising to about 120° C. The reaction mass forms a tough yellow gel in about 2 to 3 minutes. On cooling the polymer is a hard clear yellow resin.

The cold unreacted mix can be used to impregnate glass fabric panels which can be laminated and pressed to form glass reinforced plastic sheets having high tensile and flexural strength and high heat resistance. Multilayer laminates, after pressing at 80 to 100° C. and 150 to 500 p.s.i. for 15 minutes have excellent stability, strength, adhesion and resistance to hydrolysis. Typical test results on such 0.08 inch panels show:

| | |
|---|---|
| Tensile, lb./in.$^2$ | 30,000 to 50,000 |
| Flex. failure, lb./in.$^2$ | 35,000 to 40,000 |
| Wt. percent loss, ½ hr. at 700° F. | 9 to 11 |
| Tensile after ½ hr. at 700° F. | 28,000 to 40,000 |
| Flex. failure ½ hr. at 700° F. | 23,000 to 27,000 |
| Tensile after 30 days' water immersion, lb./in.$^2$ | 34,000 to 38,000 |

Selected compounds among the lower tertiary imines may be selected for specific applications. In the formation of polyisocyanate resins, the N-$C_1$ to $C_6$ alkyl ethylene imines may be used advantageously.

Example III

In a series of preparations of useful polymers by the polymerization of mixtures of diisocyanates (e.g., tolylene diisocyanate, diisocyanatophenylmethane, xylylene diisocyanate, and/or naphthalene diisocyanate) and monoisocyanates (e.g., phenylisocyanate, chlorophenyl isocyanate, and/or naphthalene isocyanate) the polymerization catalyst is chosen from among the group consisting of: N-methylethylene imine; N-heptyl ethylene imine; the intervening C₂-C₆ N-alkyl ethylene imines; N-methyl propylene imine; 1,2,3-trimethylethylene imine; N-benzyl ethylene imine; and other lower tertiary imines of the formula:

in which each of R and R' is selected from hydrogen and lower alkyl and A is selected from lower alkyl and benzyl and the lower tertiary imine has at least 3 but not more than 9 carbon atoms. In the preparations employing only the lower tertiary imine as the catalyst, the concentration of catalyst is within the range from 0.01 to 5 parts of catalyst per 100 parts of organic composition to be polymerized.

In another series of preparations, various combinations of lower tertiary imines and tertiary amines are employed satisfactorily as catalysts. Among the useful tertiary amines are: triethylenediamine; 2-methyl triethylenediamine; N,N'-dimethyl piperazine; N-methyl morpholine; N,N,N',N'-tetramethyl butanediamine-1,3; and triethyl amine. Lower tertiary imines are also effective accelerators and/or co-catalysts in combination with stannous octoate, dibutyltindilaurate, cobalt 2-ethyl hexoate, lead octoate, iron acetonyl-acetonate, and equivalent metal compounds. The lower epoxyalkanes such as propylene oxide and butylene oxide are inexpensive co-catalysts for reducing the cost of the use of N-methylethylene imine as the polymerization catalyst. Combinations of two or more components among the tertiary amines, metal compounds, and lower epoxy alkanes may also be employed as co-catalysts with the lower tertiary imines.

*Example IV*

A mixture of two moles of tolyl isocyanate and one mole of tolylene diisocyanate is polymerized by treatment with 1% by weight of a catalyst composition having the proportions of 2 moles of triethylenediamine and 1 mole of N-benzyl ethylene imine. The low viscosity reaction mixture is poured into a hot mold, heated for 20 minutes at 120° C. to provide a fully cured plastic article which is not further embrittled by an accelerated aging test for one hour at 150° C.

*Example V*

In a mixture of 513 parts by weight of heptadecanol (2 mols=2 equiv. OH) and
147 parts by weight of tetrakis-2-hydroxypropyl ethylene diamine (0.5 mol=2 equiv. OH)
6.6 parts by weight of diazabicyclooctane are dissolved with stirring
700 parts of tolylene diisocyanate (4 mols=8 equiv. NCO)

are added and polymerization is initiated on mixing. Within two minutes the pot temperature rises to 112° C. with the formation, on cooling, of a viscous yellow polymer. To this intermediate polymer (polyurethane prepolymer)—

(a) 0.8 part by weight of N-methyl ethylene imine is added with stirring with further polymerization evidenced by an exothermic reaction in which the temperature rises to about 120° C. in twelve minutes. On cooling, a clear solid resin is obtained.

*Example VI*

To 100 parts by weight of a polyether prepolymer liquid containing approximately 2 equivalents of —NCO per 2000 g./mol
0.11 part by weight of diazabicyclooctane dissolved in
0.22 part by weight of hexanetriol and
0.08 part of N-methyl ethylene imine are added.

After mixing about 1 minute, the mixture is degassed (under 10 mm. Hg vacuum for 3 minutes) and poured into a preheated mold. After curing 30 minutes at 105° C. the elastometer specimen is a tough resilient polymer.

Molding or casting resins as described above can be varied in their properties by using more or less diisocyanate provided that an effective polymerizable excess of isocyanate is present to form the desired polyisocyanate product. Polyurethane prepolymers of the desired molecular weight and degree of polymerization and containing a polymerizable excess of isocyanate may be prepared in any desired manner using any desired catalyst, and thereafter adding the lower tertiary imine.

When used in isocyanate polymerization, lower tertiary imines used alone are effective in concentrations of from 0.01% to about 2.5% by weight of the isocyanate. Similarly, when used in combination with olefin oxides as activators, the lower tertiary imines are usually present in the concentration range of 0.01% to 1.0% by weight of the isocyanate, with the olefin oxide concentration in the range of 1% to 5% by weight of the isocyanate. Thus the alkylene oxide activator is generally present in the range of 1 to 500 parts by weight per part of lower tertiary imine catalyst. When used in combination with active co-catalysts such as diazabicyclooctane, lower tertiary imines are usually present in the ratio of from about 0.01 part to 2.0 parts by weight per 100 parts of isocyanate, with from 0.1 to 1.0 part of diazabicyclooctane per 100 parts of isocyanate.

Obviously many modifications and variations of the invention as hereinbefore set forth may be made without departing from the spirit and scope thereof, and therefore only such limitations should be imposed as are indicated in the appended claims.

What is claimed is:

1. The method of preparing a polyisocyanurate composition which consists of preparing a reaction mixture consisting essentially of aromatic diisocyanates; adding to such reaction mixture a catalyst composition providing 0.1 to 1 part of triethylenediamine per 100 parts of said aromatic diisocyanate and from 0.01 to 2.0 parts by weight of a lower tertiary imine per 100 parts of said aromatic diisocyanate, said tertiary imine having at least 3 but not more than 9 carbon atoms per molecule and of the formula

in which each of R and R' is selected from the group consisting of H and lower alkyl and A is selected from the group consisting of benzyl and lower alkyl; and recovering the polyisocyanurate composition resulting from the polymerization of the reaction mixture under the influence of said catalyst composition.

2. The method of preparing a polyisocyanurate composition which consists of preparing a reaction mixture consisting essentially of about 100 parts of a polymer having 2 equivalents of —NCO per 2000 molecular weight; adding about 0.11 part of triethylene diamine and about 0.08 part of N-methyl ethylene imine; degassing the heated mixture at about 10 mm. mercury absolute pressure for about 3 minutes; pouring the degassed mixture into a hot mold for curing for about 30 minutes at about 105° C.; and recovering a tough, resilient elastomer from the mold.

References Cited in the file of this patent

UNITED STATES PATENTS

| | | |
|---|---|---|
| 2,939,851 | Orchin | June 7, 1960 |
| 2,979,485 | Burhus | Apr. 4, 1961 |
| 3,042,632 | Erner | July 3, 1962 |
| 3,054,757 | Britain | Sept. 18, 1962 |